Patented July 8, 1952

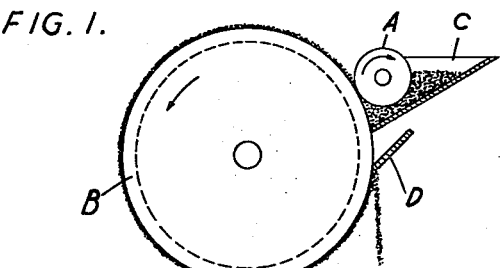
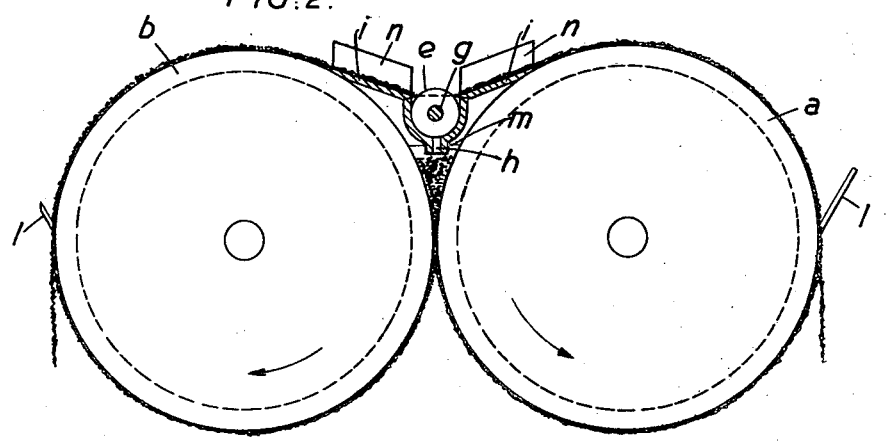
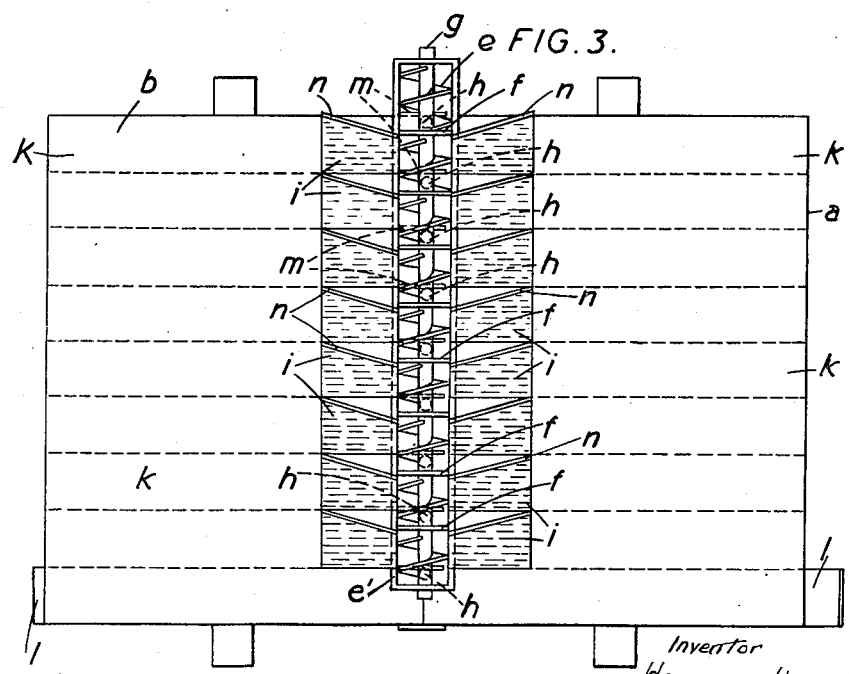

2,602,743

UNITED STATES PATENT OFFICE 2,602,743

PROCESS FOR THE FLAVOR DEVELOPMENT
AND ENNOBLEMENT OF CHOCOLATE

Hermann Kurt Wiemer, Wallington, England

Application December 10, 1949, Serial No. 132,352
In Great Britain December 10, 1948

3 Claims. (Cl. 99—23)

The invention relates to improvements in processes for the treatment of chocolate for the development of its flavor and improvement of the chocolate product.

The apparatus disclosed in this application is claimed in divisional application Ser. No. 200,317, filed December 12, 1950.

In former times chocolate was subjected in Swiss fondant machines or conches (longitudinal machines) to the special grinding process which is nowadays carried out in rolling mills while the old longitudinal machine is now used only for flavour improvement or ennoblement and development.

Although, due to the method of working, in a longitudinal machine, it is a matter of chance how often the particles of the mass are worked i. e. how often they pass through the gap between the runner and the bed and come to the surface to give off certain gases, manufacturers still make use of the longitudinal machine in spite of its irrational method of operation because the chocolate produced in it has a particularly pleasant flavour.

It is understandable therefore that the problem of devising a machine which would operate economically and produce results equally as good as those obtainable by the longitudinal machine has engaged the attention of experts in the art. In the last 25 years many suggestions have been made which were based partly on different theories and it must be admitted that advances have been made, particularly as regards the saving of time, yet the efficiency of the longitudinal machine in improving the flavour has not been attained by such improvements and modern machines possess the same defect of the longitudinal machine that many particles of the mass are worked too much while others are worked too little.

The invention is directed to the solution of the problem of replacing the old longitudinal machine by a treatment of chocolate mass whereby the chocolate mass is improved in flavour in a continuous working process in a short time and each particle of the mass is subjected with certainty to one and the same treatment.

In order to provide a solution of the problem the operations in longitudinal machines were subjected to exact observation. It was found that during the working of the longitudinal machine the sugar particles of the mass were not substantially further reduced in size but the cocoa particles both in the grinding between the runner and the bed and also in the movement of the mass itself were so affected that they gave off aromas with which the sugar and the cocoa-butter were enriched. As the working operation took place with a certain degree of heat a corresponding evaporation of ethereal constituents at the surface of the chocolate occurred, reducing the flavour of the chocolate in the course of the work to an unpleasant extent. In addition, a number of chemical reactions took place which need not here be further discussed.

In the best known longitudinal machine the tank holds about 200 kilograms of material, and the chocolate in the same had to be treated for about 72 hours so that the throughput per minute amounted to about 50 grams. The roller, the so-called runner of the longitudinal machine, rolls in a minute over about 20 square metres of surface while the machine has a steady evaporative surface of about 1 square metre which is changed about 60 times per minute.

Based on these observations an already ground chocolate mass again made soft must be subjected to a kneading and grinding operation in which the sugar particles have a grinding action on the cocoa particles but in which the sugar particles are not substantially reduced in size and that the chocolate mass must be exposed to the air for removal of the excess aroma and moisture. An ennobling or flavour-improving machine acts advantageously if care be taken in its construction to ensure that each particle is kneaded, ground and subjected to evaporation in like manner, and if the relation of grinding, kneading and evaporation to the output is that of a good longitudinal machine. In consequence it is possible to attain the result if the finely ground chocolate mass rendered soft is passed through longitudinally extending rolls the distance apart of which is greater than the grain size of the sugar and the chocolate mass is spread on a particularly large roll or rolls in a very thin layer and the path of the mass is such that all particulars are acted on in the same manner. Care must be taken that the chocolate spread on the surface of the rollers is given sufficient time for the volatile and ethereal particles and the evaporated moisture to escape. This surface and the time during which the mass is on this surface as well as the work between the rolls should be such as to correspond with the results obtained with longitudinal machines. In this way an apparatus can be provided which in a single passage through the machine produces masses of improved flavour and permits of continuous and thus economical working.

The invention thus consists in this that chocolate finished as regards reduction in size of the sugar grains and as regards mixing of sugar and cocoa as it comes from the refiner, after it is again softened, is applied to, one or both of a pair of heated rolls, the gap between which is somewhat greater than the sugar grains between which the cocoa particles are subjected to a regular grinding action, which rolls rotate very slowly and at least one of which has a large surface to which the chocolate is applied in a thin layer and in a single continuous passage whereby the chocolate gives up so much of the ethereal aroma materials that it acquires a pleasant mild character. The rolls are preferably heated electrically.

In one practical form of the apparatus the mass is desirably delivered to one end of a long roll which cooperates with a counterroll maintaining the desired size of gap and the mass is fed over the length of the roll by means of a screw conveyor or worm which is divided lengthwise so that a strip of the mass is fed in spires corresponding to the subdivisions from one end of the roller to the other end. In this way the result is obtained that the mass is repeatedly fed through the gap between the rolls and spread on a suitably large surface. The rolls which are of particularly large dimensions have speeds of rotation which are much smaller than those in the rolling mills and the distance apart of the rolls is greater than the size of the sugar particles.

A machine is known in which both the grinding of the chocolate and the improvement in the flavour are carried out by means of one and the same rolling mill. This machine however possesses the faults of the longitudinal machine. It requires too much power since with every passage the power required is the same and it has the disadvantage of non-continuous working whereas the ideas underlying the present invention are based on knowledge of the operations taking place in the improvement of flavour in the longitudinal machine, according to which the grinding effect must be small and the possibility of evaporation must be great. It is understandable that only poor results could be obtained with such a known machine as in a rolling mill the grinding work is considerable and the possibility of evaporation is of minor importance.

For a clearer explanation of the invention two embodiments of apparatus suitable for the performance of the method are illustrated in the accompanying drawing, Fig. 1 illustrating diagrammatically one embodiment and Figs. 2 and 3 showing another embodiment in side view partly in section and partly in plan respectively.

Referring to Fig. 1, chocolate prepared and rendered soft for example in the known grinding mechanism (refiners) is supplied by way of a hopper C to the flavour improving rolling mill which consists of the rolls A and B. The two rolls run at different speeds so that the mass is drawn into the gap between the rolls from the hopper. This gap is so dimensioned that it just exceeds the grain size of the sugar particles in the chocolate mass.

In the single passage through the gap between the rolls the mass is spread in a thin layer on the surface of the rolls and due to the friction between the particles of cocoa mass and the sugar particles grinding of the cocoa mass particles takes place in the gap in the above described manner. By suitable dimensioning of the rolls a surface for the thin layer on the roll B is provided which travels at a speed based on experience in the working of the longitudinal machines.

In the manner above described a single passage of the mass takes place, all particles being subjected with certainty to the desired action and to one and the same treatment. By means of the scraper D the finished ennobled mass is removed from the roll B so that the ennobling operation takes place in a continuous manner and is complete. The device can when desired be connected direct to the refiner or to a mixer which serves to liquefy the mass.

In the arrangement illustrated in Figs. 2 and 3 the horizontal axes of the rolls $a$ and $b$ which in this form are of the same dimensions lie in the same horizontal plane. These rolls are of considerable length and above the gap between them is disposed a conveyor screw or worm $e$ in a casing $e'$ which is subdivided by intermediate partitions $f$ into separate chambers disposed in series in the longitudinal direction. The shaft $g$ of the conveyor screw extends through the casing $e'$ from one end to the other while the worm is subdivided into portions structurally separate from one another and located respectively in the chambers of the series. Each of the divided chambers has at the bottom at the forward end of the corresponding worm an outlet opening $h$ for the chocolate mass. Adjacent each chamber except the first are arranged scrapers $i$ having side walls $n$ for directing the chocolate mass scraped off portions of the rolls $a$ and $b$ into such chamber.

When the mass is delivered at one end into the first chamber of the series it is fed through the corresponding bottom aperture $h$ on to the rolls $a$ and $b$ in the neighbourhood of the gap between the rolls which is divided by vertical division walls $m$ spaced apart a distance corresponding to the length of the chambers formed by the partitions $f$. In consequence the mass moves over a path $k$ corresponding to the length of the chamber on the rolls $a$ and $b$. It is finally scraped off by scrapers $i$ adjacent this path and fed into the next conveyor chamber by suitably inclining the scrapers $i$ and the side walls $n$ as shown in Fig. 3.

In this way the mass is advanced progressively lengthwise of the rolls, the mass being fed always in narrow strips through the gap between the rolls $a$ and $b$ which gap as already stated just exceeds the size of the sugar grains present in the mass. In Fig. 3, the borders between adjacent paths or strips $k$ on the rolls $a$ and $b$ are indicated by the dotted lines on the rolls $a$ and $b$. In this way with considerable certainty the result is obtained that all particles of the mass are fed through the gap in the rolls and treated, the division into strips on the rolls providing the necessary extent of surface which is required for evaporation. When required or desired, a number of such rolling mills can be provided above one another, the mass then being removed from the rolls $a$ and $b$ by scrapers $l$.

As is known, the flavour of the chocolate mass is affected by the particles of iron ground off in the grinding operation, for example from chilled rollers, so that the flavour ennoblement is affected. In order to avoid this disadvantage, in accordance with a further feature of the invention the rolls for the rolling mill are made of a material which gives off particles which do not affect the taste. This material must naturally be hard so as to limit the particles given off to the minimum and being immune to attack by the acid constituents of the chocolate mass, and consists for example of hard porcelain, Carborundum or nickel-chrome steel.

I claim:

1. Process for the development of the flavour of chocolate consisting in continuously feeding a sugar-containing chocolate mass already ground and in soft condition between heated rolls presenting a gap between them just exceeding the size of the sugar grains in the mass, conducting the mass of sugar in a spiral path over the rolls, heating the rolls and thereby heating the chocolate passing thereover, and continuously stripping the thin layer from the rolls remote from the location at which the thin layer is deposited on the rolls.

2. A process for the development of the flavor of chocolate, comprising continuously feeding a sugar-containing chocolate mass already ground and in soft condition between a pair of heated adjacently mounted rotating grinding rolls having a gap therebetween just exceeding the size of the sugar grains in the chocolate mass, the chocolate to be treated being fed continuously to the rolls at one end thereof and applied to a portion of each roll in a thin layer at said end, stripping the chocolate of said layers from the rolls as the rolls rotate and feeding the stripped chocolate between the rolls at a position adjacent to said layers on said end portions of the rolls, repeating the foregoing operation to advance the chocolate longitudinally across the rolls from the feed end, and stripping chocolate from the respective rolls at their ends opposite the feed end, whereby chocolate supplied to the rolls at the feed end thereof is ground between the rolls a plurality of times in passing from the feed end to the opposite end of the rolls.

3. A process as claimed in claim 2, in which a series of thin parallel bands of chocolate is maintained on the rolls from one end to the other during the processing of the chocolate mass.

HERMANN KURT WIEMER.

REFERENCES CITED

The following references are of record in the file of this patent:

UNITED STATES PATENTS

| Number | Name | Date |
| --- | --- | --- |
| 1,117,594 | Neumann | Nov. 17, 1914 |
| 1,591,979 | Iff | July 13, 1926 |
| 1,596,860 | Klaus | Aug. 17, 1926 |
| 2,004,009 | Moir | June 4, 1935 |
| 2,313,705 | Jack | Mar. 9, 1943 |